United States Patent
Koiwai et al.

(10) Patent No.: US 6,570,719 B2
(45) Date of Patent: May 27, 2003

(54) LENS BARREL AND METHOD OF ASSEMBLING THE SAME

(75) Inventors: Tamotsu Koiwai, Akiruno (JP); Ai Midorikawa, Saitama (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 10/091,250

(22) Filed: Mar. 4, 2002

(65) Prior Publication Data

US 2002/0141078 A1 Oct. 3, 2002

(30) Foreign Application Priority Data

Mar. 29, 2001 (JP) ........................................ 2001-096843

(51) Int. Cl.[7] ............................................... G02B 15/14
(52) U.S. Cl. ........................ 359/704; 359/700; 359/701
(58) Field of Search ................................. 359/694, 699, 359/700, 701, 703, 704, 823

(56) References Cited

U.S. PATENT DOCUMENTS 5,216,549 A * 6/1993 Notagashira et al. ....... 359/703

FOREIGN PATENT DOCUMENTS

JP 11-305106 A 11/1999

* cited by examiner

*Primary Examiner*—Ricky Mack
(74) *Attorney, Agent, or Firm*—Frishauf, Holtz, Goodman & Chick, P.C.

(57) ABSTRACT

A lens barrel includes a zoom frame for holding a first-group frame and a second-group frame. Three follower pins are implanted in the second-group frame, and each of the follower pins includes a flange portion and a thrust abutment portion. The flange portions are interposed between the outer periphery of the second-group frame and the inner periphery of the zoom frame, so that decentering of the optical axis of the second-group frame is adjusted by the difference of the thicknesses of the flange portions. The thrust abutment portions abut on the rear end surface of insertion grooves of the zoom frame, so that inclination of the optical axis of the second-group frame is adjusted by the difference of the outside diameters of the thrust abutment portions. The position and the inclination of the optical axis of lenses can be easily adjusted by selecting and mounting the follower pins.

30 Claims, 10 Drawing Sheets

LENS BARREL AND METHOD OF ASSEMBLING THE SAME

This application claims the benefit of Japanese Application No. 2001-096843 filed in Japan on Mar. 29, 2001, the contents of which are incorporated herein by reference.

BACKGROUND OF THE INVENTION

1. Field of the Invention

The present invention relates to a lens barrel in which an optical axis can be adjusted and to a method of assembling the same.

2. Description of the Related Art

Conventionally, various proposals have been made for an optical axis adjustment mechanism of lens groups in a lens barrel used in cameras, and the like. For example, Japanese Unexamined Patent Application Publication No. 11-305106 discloses an optical axis adjustment mechanism used in a lens barrel employing an optical system, and the optical axis adjustment mechanism advances and retracts lens groups for focusing and zooming.

In this conventional optical system lens barrel, three helicoid pieces are attached to a lens group frame by screws to support the lens group frame such that it is free to advance and retract with respect to a main lens barrel member. Adjustment spacers are inserted into the helicoid pieces to prevent the backlash between helicoid thread on the lens barrel main body side and the helicoid pieces and simultaneously to adjust the center axis of the optical axis of the lens groups.

However, assembly is time-consuming in the arrangement disclosed in Japanese Unexamined Patent Application Publication No. 11-305106 because it requires inserting the adjustment spacers in each lens group frame. Further, the optical axis can be adjusted only in a direction perpendicular to the optical axis, and the inclination of the optical axis cannot be adjusted.

Further, there is also a method of providing a gap at the portion where the lens group frame is supported and bonding and securing lens groups such that they are centered from the outside. However, workability is not good in this bonding method because variation with time must be taken into consideration and further bonding is required.

Furthermore, as a generally employed optical axis adjustment method, there is also a method of obtaining a desired accuracy for an optical axis by correcting a metal mold while measuring the decentering of an optical axis positioning member acting as a molded member. In this method, however, it is necessary to perform adjustment again when the molding conditions change, thus requiring a long preparation time to produce parts.

SUMMARY OF THE INVENTION

An object of the present invention, which was made to overcome the above disadvantages, is to provide a lens barrel in which the position of the optical axis of the lens barrel and/or the inclination of the optical axis thereof can be easily adjusted, and to provide a method of assembling the lens barrel.

The lens barrel of the present invention includes a first frame member for supporting lenses; a second frame member for holding the first frame member; and a plurality of adjustment members interchangeably secured to the first frame member, each of the plurality of adjustment members including an abutment portion, which abuts on the second frame member in an optical axis direction to adjust the amount of inclination of the lenses with respect to the optical axis of other lenses in the lens barrel through the second frame member, and an inserted portion that is inserted between the first frame member and the second frame member to adjust the decentering between the optical axis of the lenses and an optical axis of other lenses in the lens barrel through the second frame member. With this arrangement, the amount of inclination and the amount of decentering of the lenses with respect to the optical axis of the other lenses are adjusted by selectively changing the adjustment members that are abutted on the second frame member to determine the relative position thereof and fixing the adjustment members to the first frame member.

Further, in a method of assembling a lens barrel of the present invention that includes a first frame member for supporting lenses, a second frame member for holding the first frame member, and a plurality of adjustment members detachably secured to the first frame member, each of the plurality of adjustment members including an inserted portion inserted between the first frame member and the second frame member to adjust the decentering between the optical axis of the lenses and an optical axis of other lenses in the lens barrel through the second frame member as well as including an abutment portion abutting on the second frame member in an optical axis direction to adjust the inclination between the optical axis of the other lenses in the lens barrel and an optical axis of the lenses through the second frame member, the method includes the steps of assembling a plurality of adjustment members, each of the plurality of adjustment members having the same shape, on the lens barrel; measuring the amount of decentering and the amount of inclination of the lenses; selecting adjustment members from a plurality of kinds of adjustment members each having a combination an inserted portion produced in a different size and an abutment portion produced in a different size based on the measured amount of decentering and inclination of the lenses; and assembling the selected adjustment members on the lens barrel.

Other featuers and advantages of the present invention will become more apparent from the following description.

DESCRIPTION OF THE PREFERRED EMBODIMENTS

Embodiments of the present invention will be described below with reference to the drawings.

Figure 1:
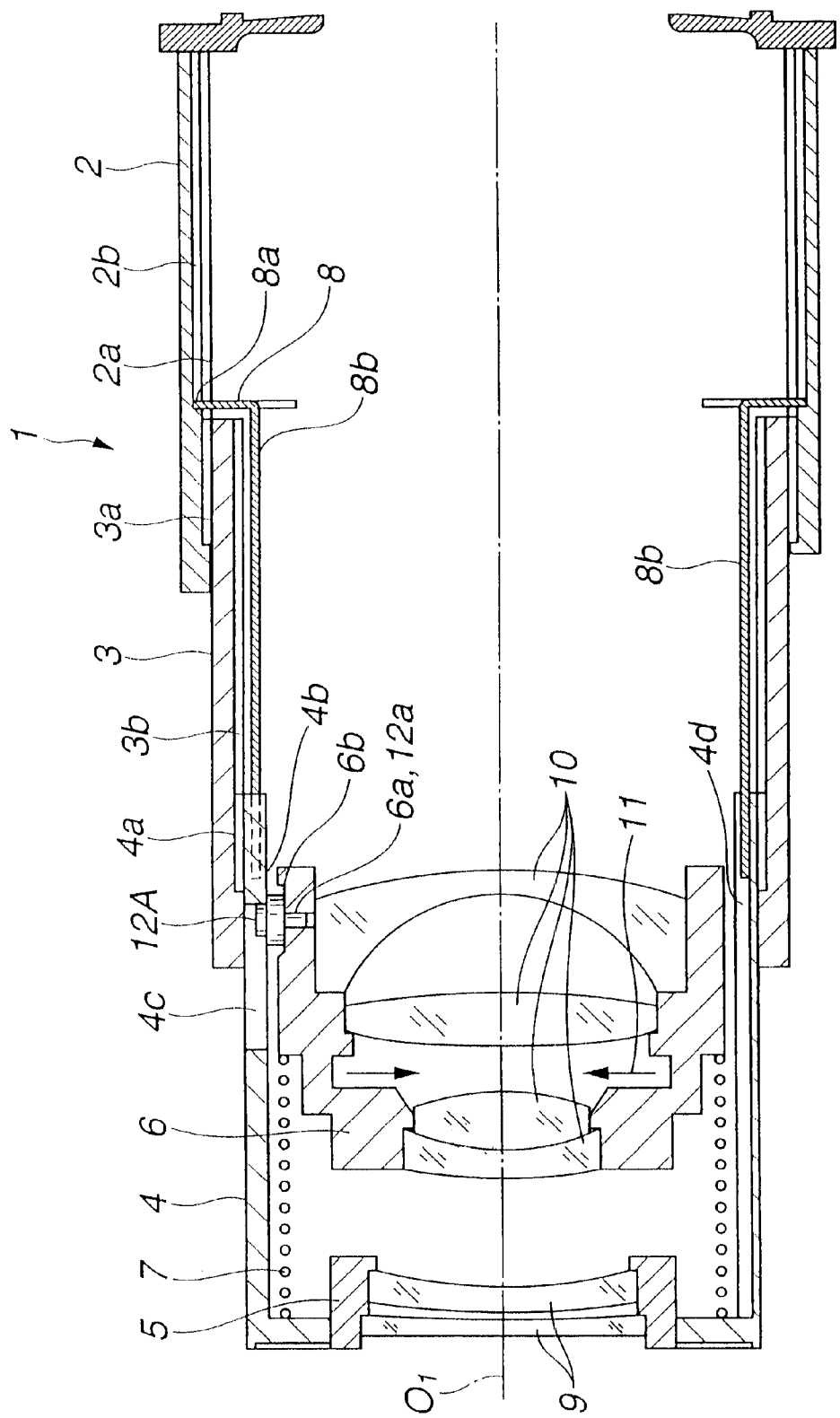
FIG. 1 is a longitudinal sectional view of a lens barrel of a first embodiment of the present invention taken along the optical axis thereof.
Figure 2:
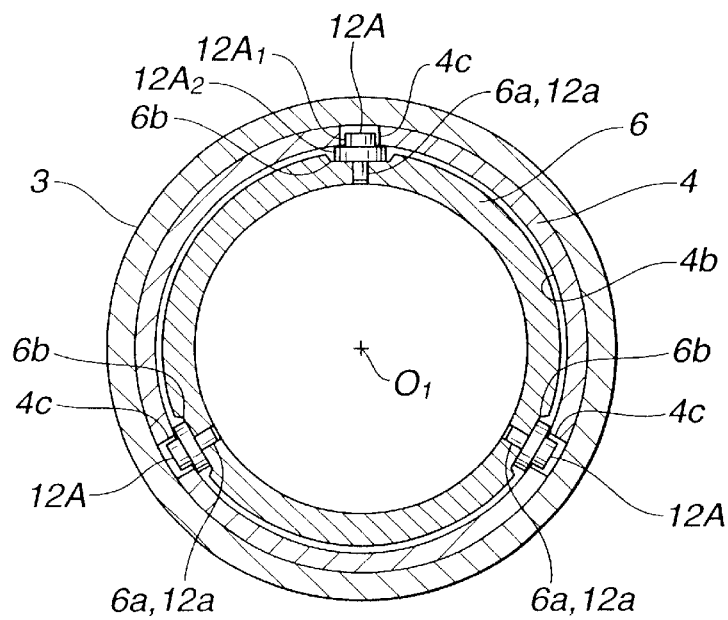
FIG. 2 is a sectional view of the lens barrel of the first embodiment shown in FIG. 1 in a direction perpendicular to the optical axis thereof and shows the cross sections of cam follower portions.
Figure 3:
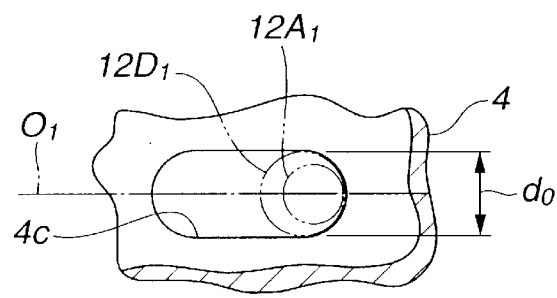
FIG. 3 is a developed elevational view of a cam follower insertion groove of a zoom frame that constitutes the lens barrel of the first embodiment shown in FIG. 1.
Figure 4:
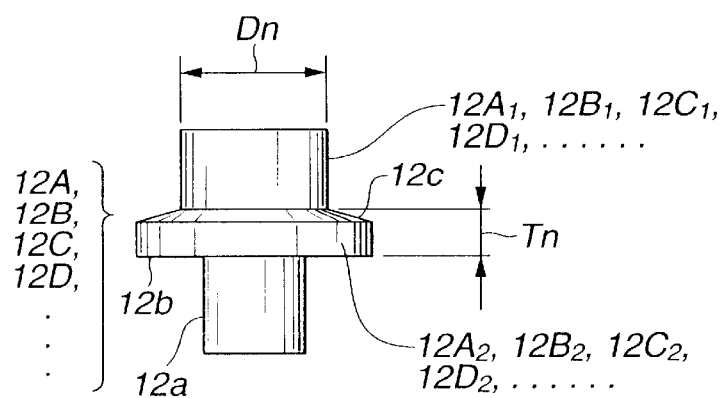
FIG. 4 is a front elevational view of a cam follower implanted in a second-group frame that constitutes the lens barrel of the first embodiment shown in FIG. 1.

FIG. 1 is a longitudinal sectional view of a lens barrel of a first embodiment of the present invention taken along the optical axis thereof. FIG. 2 is a sectional view of the lens barrel in a direction perpendicular to the optical axis thereof and shows the cross sections of follower pin portions. FIG. 3 is a developed elevational view of the follower pin insertion groove of a zoom frame that constitutes the lens barrel. FIG. 4 is a front elevational view of a follower pin implanted in a second-group frame that constitutes the lens barrel.

The lens barrel 1 of the first embodiment is a lens barrel capable of performing zooming and is composed of a fixed frame 2, a rotary frame 3, a zoom frame 4, a first-group frame 5, a second-group frame 6 holding a second lens group 10 and a shutter 11, and a linear-movement key 8. The rotary frame 3 is supported so as to rotate as well as to advance and retract with respect to the fixed frame 2 and is driven in rotation by a lens barrel drive unit (not shown); the zoom frame 4 is supported so as to rotate as well as to relatively advance and retract with respect to the rotary frame 3; the first-group frame 5 holds a first lens group 9; and the second-group frame 6 holds the second lens group 10 and the shutter 11. Note that the center axis of the first-group frame 5 that also acts as the optical axis of the first lens group 9 is called an optical axis $O_1$, and the center axis of the second-group frame 6 that also acts as the optical axis of the second lens group 10 is called an optical axis $O_2$ (the optical axis before it is adjusted is denoted by reference numeral $O_2'$).

The fixed frame 2 has a helicoid female thread 2a and a linear-movement guide groove 2b on the inner peripheral portion thereof.

The rotary frame 3 has a helicoid male thread 3a on the outer peripheral portion at the rear end thereof and a helicoid female thread 3b on the inner peripheral portion thereof. The helicoid male thread 3a is threaded into the helicoid female thread 2a of the fixed frame 2. The rotary frame 3 is driven in rotation by the lens barrel drive unit (not shown) and extends from a collapsed position to a photographing position while being rotated with respect to the fixed frame 2.

The linear-movement key 8 includes a projection 8a, which is slidably inserted into the linear-movement guide groove 2b of the fixed frame 2, and a key unit 8b which guides the linear-movement of the zoom frame 4. The linear-movement key 8 integrally advances and retracts in the optical axis direction while being guided to move linearly through the fixed frame 2 by means of a known support mechanism.

The zoom frame 4 is arranged as a second cylindrical frame member and includes a helicoid male thread 4a, three follower pin insertion grooves 4c, and a key groove 4d. The helicoid male thread 4a is disposed on the outer peripheral portion at the rear end of the zoom frame 4 and is threaded into the helicoid female thread 3b of the rotary frame 3, the three follower pin insertion grooves 4c are formed on the cylindrical portion of the zoom frame 4 along the optical axis direction, and the key unit 8b of the linear-movement key 8 is slidably inserted into the key groove 4d. Further, the first-group frame 5 is secured to the front portion of the zoom frame 4. The zoom frame 4 advances and retracts while being guided by the linear-movement key 8 so as to move linearly.

The second-group frame 6 is arranged as a first cylindrical frame member and has three implanting holes 6a which are defined on the peripheral portion thereof to secure the follower pins. Flat radial abutment surfaces 6b, on which the flange portions of follower pins 12A 12B, . . . , and the like abut, are formed around the implanting holes 6a. An urging spring 7 that is a compressed spring is inserted between the zoom frame 4 and the second-group frame 6 so as to urge the second-group frame 6 rearward (towards an imaging side) with respect to the zoom frame 4 at all times. Then, the second-group frame 6 is driven by the zoom frame 4 in an extending direction by three follower pins of a plurality of follower pins 12A, 12B, 12C, 12D, . . . and positioned.

The above three follower pins are selected from the plurality of follower pins 12A, 12B, . . . the optical axis adjustment portions of which have a different size, as shown in FIG. 4, and are forcibly implanted in the three implantation holes 6a. Then, the respective follower pins are detachably implanted in the implanting holes 6a.

The follower pins 12A, 12B, 12C, 12D, are follower pin members that also function as adjustment members for adjusting the optical axis. The follower pins 12A, 12B, 12C, 12D, . . . have fixing shaft portions 12a, thrust abutment portions $12A_1$, $12B_1$, $12C_1$, $12D_1$, . . . , and flange portions $12A_2$, $12B_2$, $12C_2$, $12D_2$, . . . . The fixing shaft portions 12a are forcibly inserted into and secured to the implanting holes 6a, the thrust abutment portions $12A_1$, $12B_1$, $12C_1$, $12D_1$, . . . act as inclination adjustment portions (abutment portions) composed of columnar shafts having various outside diameters Dn and are each formed in a different shape, respectively, and the flange portions $12A_2$, $12B_2$, $12C_2$, $12D_2$, . . . act as decentering adjustment portions (portions to be inserted) having various thicknesses Tn.

The surface of each of the flange portions $12A_2$, $12B_2$, . . . on the shaft portion 12a side thereof is formed as a flat surface 12b, whereas the surface of each of the flange portions $12A_2$, $12B_2$, . . . on the thrust abutment portion $12A_1$, $12B_1$, . . . side thereof is formed as a partially spherical surfaces 12c that corresponds to the curvature of the inner peripheral surface 4b of the zoom frame 4. When the follower pins are implanted, the flat surfaces 12b abut on the radial abutment surfaces 6b of the second-group frame 6, and the partially spherical surfaces 12c abut on the inner peripheral surface 4b of the zoom frame 4, that is, the flange portions $12A_2$, $12B_2$, $12C_2$, . . . are able to be inserted between the second-group frame 6 and the zoom frame 4.

Further, as shown in FIG. 3, the follower pin insertion grooves 4c of the zoom frame 4 have a width d0 so that even the abutment portion having the maximum diameter among the abutment portions $12A_1$, $12B_1$, . . . of the applicable follower pins can be inserted into the follower pin insertion grooves 4c.

The position of the second-group frame 6 in the radial direction of the optical axis O2' is determined with respect to the inner peripheral surface 4b of the zoom frame 4 through the flange portions $12A_2$, $12B_2$, . . . of the follower pins 12A, 12B, . . . interposed therebetween. Further, the second-group frame 6 is urged rearward relative to the zoom frame 4 and the first-group frame 5 by the urging force of the urging spring 7. When the second-group frame 6 extends, the thrust abutment portions $12A_1$, $12B_1$, . . . of the three follower pins 12A, 12B, . . . abut on the rear end (imaging side) of the follower pin insertion grooves 4c of the zoom frame 4. In the abutment state, the position of the second-group frame 6 in the optical axis direction and the inclination of the optical axis are determined.

Accordingly, the decentering of the optical axis O2' of the second-group frame 6 with respect to the optical axis O1 is adjusted by the difference of the thicknesses Tn of the flanges $12A_2$, $12B_2$, . . . of the three follower pins 12A, 12B, . . . . At the same time, the inclination of the optical axis O2' of the second-group frame 6 with respect to the optical axis O1 of the first-group frame 5 is adjusted by the difference of the outside diameters Dn of the thrust abutment portions $12A_1$, $12B_1$ . . . of the follower pins 12A, 12B, . . . .

When the lens barrel 1 having the above arrangement is collapsed, the rotary frame 3 and the zoom frame 4 are retracted into the fixed frame 2. The second-group frame 6 moves to a position relatively close to the first-group frame 5 against the urging force of the urging spring 7.

When the lens barrel 1 is in a wide angle state or a telescopic state where photographing is possible, the rotary frame 3 is driven in rotation and extends forward of the fixed frame 2, and the zoom frame 4 that holds the first-group frame 5 also extends further forward with respect to the rotary frame 3, as shown in FIG. 1. In addition, the second-group frame 6 extends together with the zoom frame 4 in a state in which the follower pins 12A, 12B, . . . abut on the rear ends of the follower pin insertion grooves 4c of the zoom frame 4.

Next, a method (assembling method) of adjusting the decentering and the inclination of the optical axis O2' of the second-group frame 6 will be described using FIGS. 5 to 8.

Figure 5:
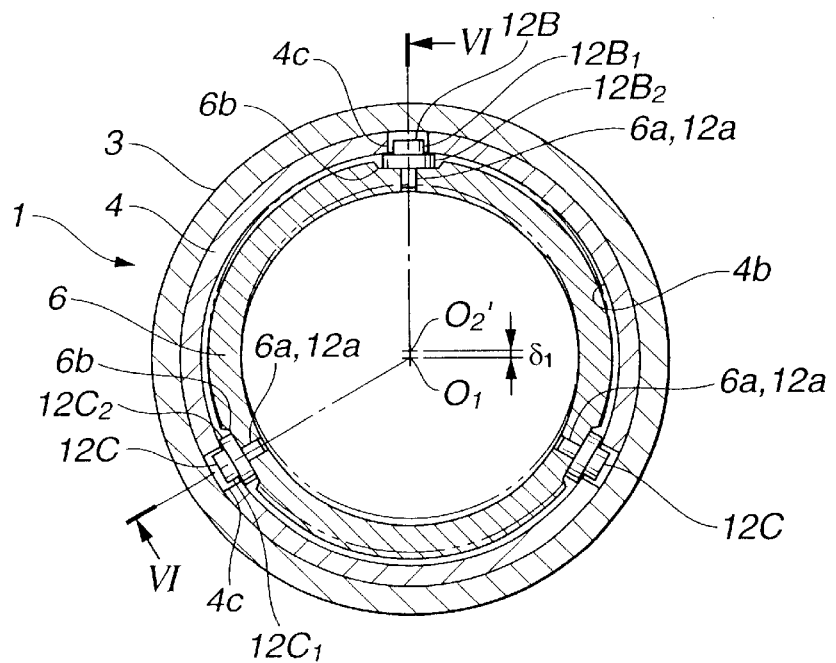
FIG. 5 is a sectional view of the lens barrel of the first embodiment shown in FIG. 1 taken in the direction perpendicular to the optical axis thereof and shows the cross sections of cam follower portions in a state in which the decentering of the optical axis is adjusted.
Figure 6:
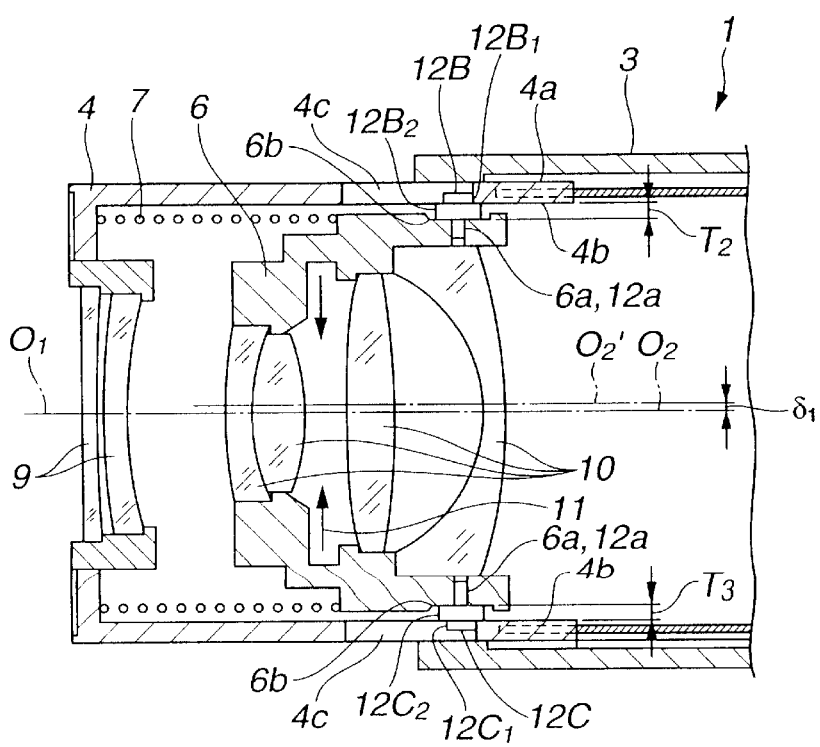
FIG. 6 is a sectional view of the lens barrel taken along the line VI—VI of FIG. 5.
Figure 7:
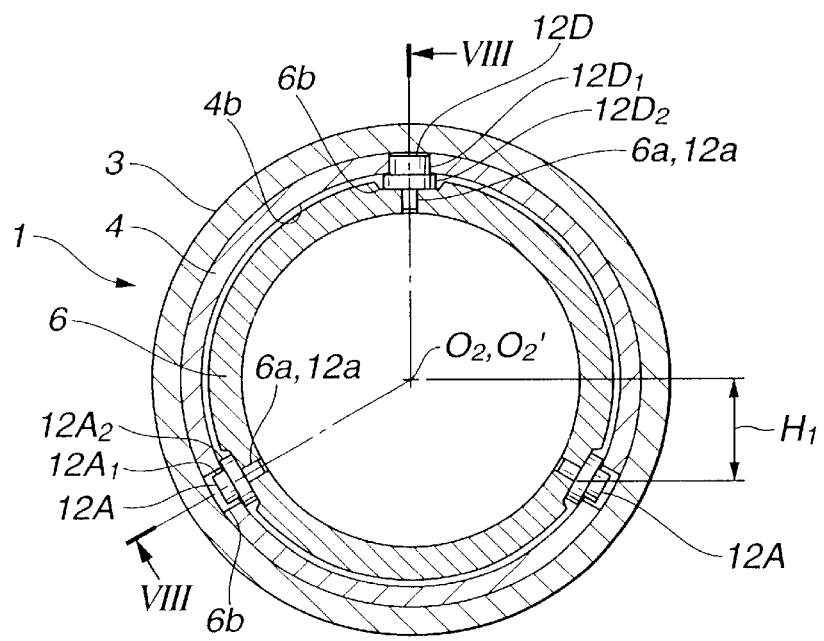
FIG. 7 is a sectional view of the lens barrel of the first embodiment shown in FIG. 1 taken in the direction perpendicular to the optical axis thereof and shows the cross sections of cam follower portions in a state in which the inclination of the optical axis is adjusted.
Figure 8:
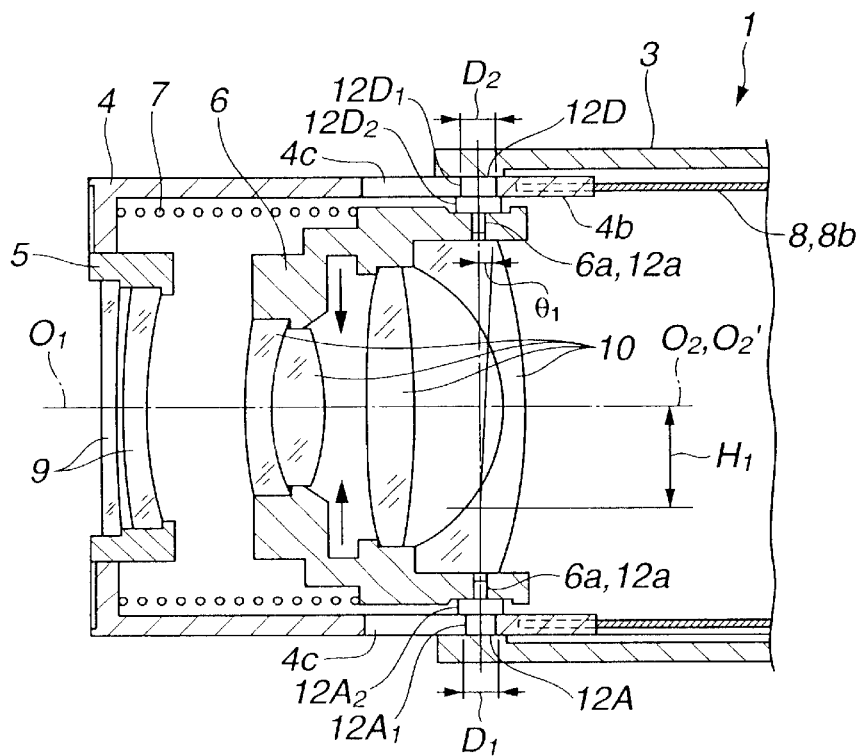
FIG. 8 is a sectional view of the lens barrel taken along the line VIII—VIII of FIG. 7.

FIG. 5 is a sectional view of the lens barrel 1 taken in the direction perpendicular to the optical axis thereof and shows the cross section of follower pin portions in a state in which the decentering of the optical axis is adjusted. FIG. 6 is a sectional view of the lens barrel 1 taken along the line VI—VI of FIG. 5. FIG. 7 is a sectional view of the lens barrel 1 taken in the direction perpendicular to the optical axis thereof and shows the cross sections of follower pin portions in a state in which the inclination of the optical axis is adjusted. FIG. 8 is a sectional view of the lens barrel 1 taken along the line VIII—VIII of FIG. 7.

When the decentering and the inclination of the optical axis are adjusted, first, three reference follower pins 12A of a standard type are mounted on the second-group frame 6 as follower pins, and the optical axis is measured using a laser-type lens decentering measuring instrument, or the like. Then, the relative amount of decentering δ1 and the relative inclination angle θ1 of the optical axis O2' of the second-group frame 6 with respect to the optical axis O1 of the first-group frame 5 are determined (refer to FIGS. 5 and 8). Note that the inclination angle θ1 of the optical axis O2' is shown by the inclination angle about the positions having a vertical distance H1 from the optical axis O2' to the two lower follower pins.

When the amount of decentering δ of the optical axis O2' of the second-group frame 6 is adjusted, one follower pin 12B and two follower pins 12C, for example, are selected. Then, as shown in FIGS. 5 and 6, the follower pin 12B is fixed to one upper portion of the second-group frame 6 and the follower pins 12C are implanted at two lower positions thereof in place of the follower pins 12A.

The flange portions $12B_2$ and $12C_2$ of the follower pins 12B and 12C have thicknesses T2 and T3, respectively, and the thickness T2 is larger than the thickness T3 and is set to a size for moving the optical axis O2' downward by δ1. Therefore, the mounting of the follower pins causes the optical axis O2' of the second-group frame 6 to move downward by the amount of decentering δ1, as shown in FIGS. 5 and 6, and thereby the optical axis O1 of the first-group frame 5 agrees with the optical axis O2 of the second-group frame 6. However, when the above adjustment is performed only for the adjustment of decentering, the outside diameters of the thrust abutment portions $12B_1$ and $12C_1$ of the follower pins 12B and 12C are set to the same as that of the thrust abutment portion $12A_1$ of the reference follower pin 12A.

Next, when the inclination θ1 of the optical axis O2' of the second-group frame 6 is adjusted, one follower pin 12D and two reference follower pins 12A, for example, are selected. Then, as shown in FIGS. 7 and 8, the follower pin 12D is fixed to one upper portion of the second-group frame 6 in place of the follower pin 12A, and the follower pins 12 at two lower portions remain as they are.

The thrust abutment portions $12D_1$ and $12A_1$ of the follower pins 12D and 12A have outside diameters D2 and D1, respectively, and the outside diameter D2 is larger than the outside diameter D1 and has a size for changing the inclination of the optical axis O2' by the inclination angle θ1. Therefore, the inclination of the optical axis O2' of the second-group frame 6 is corrected by the inclination angle θ1, as shown in FIG. 8, and thereby the direction of the optical axis O1 of the first-group frame 5 agrees with the direction of the optical axis O2 of the second-group frame 6. However, when the above adjustment is performed only for the adjustment of inclination, the thicknesses of the flange portions $12D_2$ of the follower pins 12D are made equal to the thickness of the flange portion 12A$_2$ of the reference follower pin 12A.

Further, when inclination must be adjusted simultaneously with the adjustment of decentering, three follower pins must be selected of which both the flange portions and the thrust abutment portions have different thicknesses and different diameters corresponding to the amount of decentering and the inclination angle that must be adjusted.

In the adjustment of the decentering and the inclination of the optical axis, a plurality of types of follower pins whose thrust abutment portions and the flange portions each have a predetermined difference in size that is set in a stepwise manner are actually prepared as follower pins 12B, 12C, 12D, . . . . Then, the amount of decentering and the inclination angle, which were actually measured, of the optical axis O2' of the second-group frame 6 are adjusted in a stepwise manner by selecting follower pins which permit the amount of decentering and the inclination angle to be set within allowable ranges after adjustment from the plurality of follower pins having sizes that are set in a stepwise manner.

According to the lens barrel 1 of the first embodiment described above, the decentering and the inclination of the optical axis can be simply and reliably adjusted by selecting and applying the follower pins, to be implanted in the second-group frame 6 whose thicknesses of the flange portions thereof and whose outside diameters of the thrust abutment portions thereof correspond to the amount of decentering and/or the inclination angle of the optical axis before adjustment from the plurality of follower pins 12A, 12B, . . . .

Further, when the zoom frame 4, the first-group frame 5, the second-group frame 6, and further the first lens group 9, and the second lens group 10 vary within predetermined ranges between individual production lots and thus the adjustment range of the optical axis is within an allowable range even if the same follower pins are applied, it is possible to adjust the optical axis without changing the shape of the follower pins to be selected, which makes the adjustment very simple.

Further, the directions in which the decentering and the inclination are adjusted are not limited to the three direction in which the follower pins are disposed as in the above example. That is, it is possible to adjust the decentering and the inclination in intermediate directions of the three directions by the combination of the sizes of the flange portions and the thrust abutment portions.

Next, the lens barrel of a second embodiment of the present invention will be described.

Figure 9:
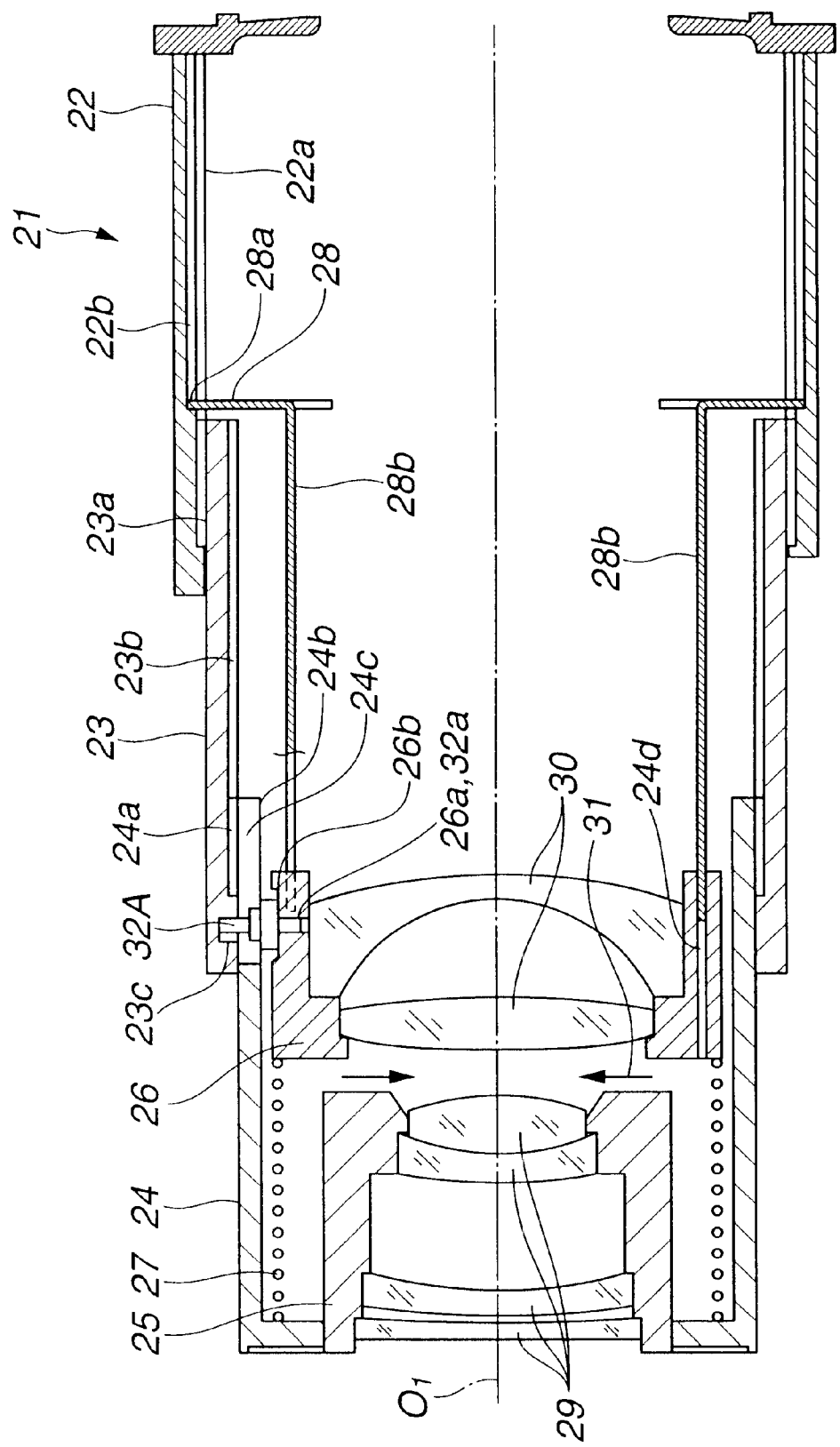
FIG. 9 is a longitudinal sectional view of a lens barrel of a second embodiment of the present invention taken along the optical axis thereof.
Figure 10:
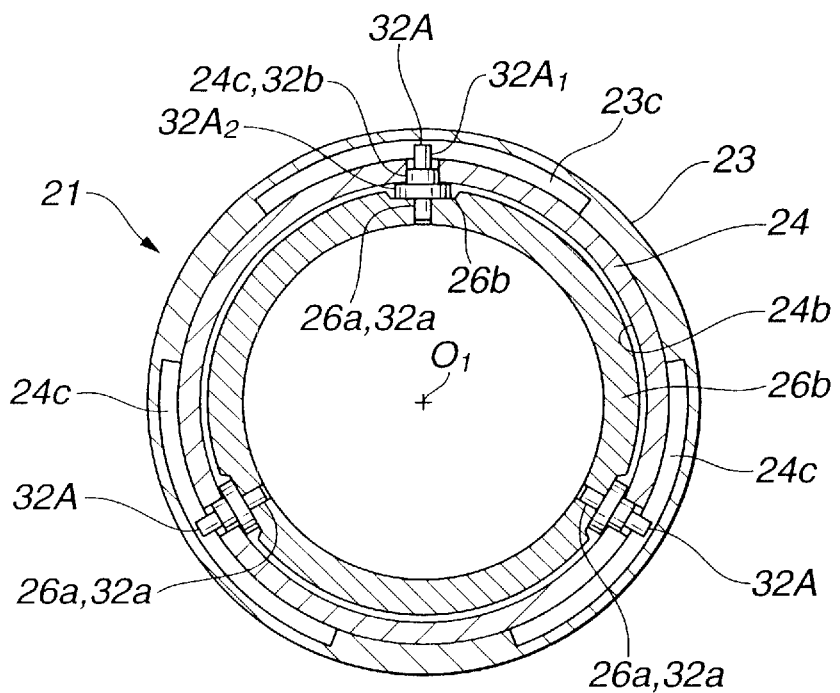
FIG. 10 is a sectional view of the lens barrel of the second embodiment shown in FIG. 9 taken in a direction perpendicular to the optical axis thereof and shows the cross sections of cam follower portions.
Figure 11:
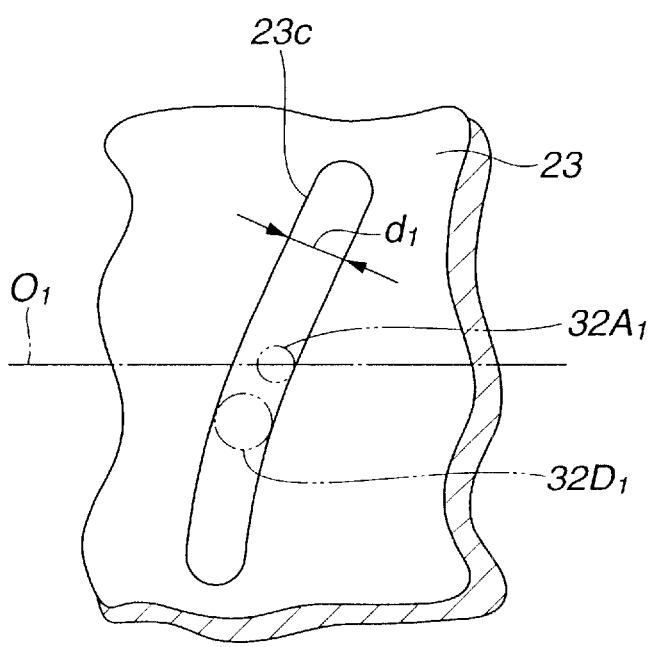
FIG. 11 is a developed elevational view of a cam groove of a rotary frame that constitutes the lens barrel of the second embodiment shown in FIG. 9.
Figure 12:
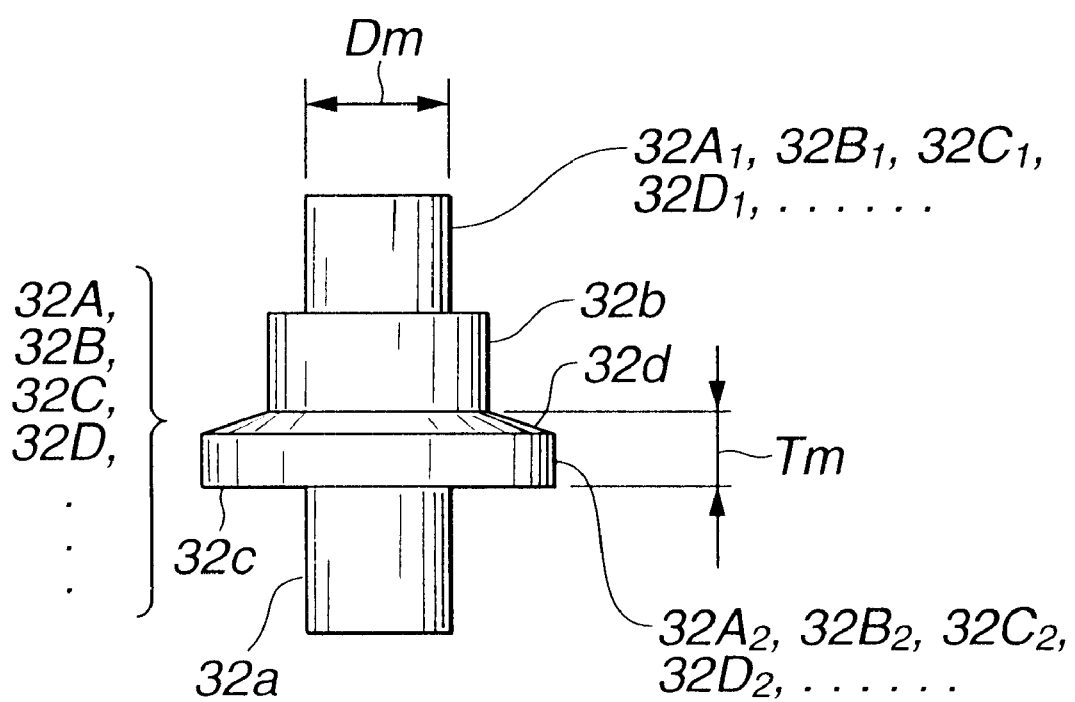
FIG. 12 is a front elevational view of a cam follower implanted in a second-group frame that constitutes the lens barrel of the second embodiment shown in FIG. 9.

FIG. 9 is a longitudinal sectional view of the lens barrel of the second embodiment of the present invention taken along the optical axis thereof. FIG. 10 is a sectional view of the lens barrel taken in a direction perpendicular to the optical axis thereof and shows the cross sections of cam follower portions. FIG. 11 is a developed elevational view of the cam groove of a rotary frame constituting the lens barrel. FIG. 12 is a front elevational view of a cam follower implanted in a second-group frame that constitutes the lens barrel.

The lens barrel 21 of the second embodiment is a lens barrel capable of performing zooming and is composed of a fixed frame 22, a rotary frame 23 acting as a third frame member, a zoom frame 24 acting as a second frame member, a first-group frame 25, a second-group frame 26 acting as a first frame member, and a linear-movement key 28. The rotary frame 23 is supported so as to rotate as well as to advance and to retract with respect to the fixed frame 22 and is driven in rotation by a lens barrel drive unit (not shown): the zoom frame 24 is supported so as to rotate as well as to relatively advance and retract with respect to the rotary frame 23, the first-group frame 25 holds the first lens group 29, and the second-group frame 26 holds a second lens group 30 and a shutter 31. Note that the center axis of the first-group frame 25 that also acts as the optical axis of the first lens group 29 is called an optical axis O1, and the center axis of the second-group frame 26 that also acts as the optical axis of the second lens group 30 is called an optical axis O2 (the optical axis before adjustment is denoted by reference numeral O2').

The fixed frame 22 has a helicoid female thread 22a and a linear-movement guide groove 22b on the inner peripheral portion thereof.

The rotary frame 23 has a helicoid male thread 23a on the outer peripheral portion at the rear end thereof, a helicoid female thread 23b on the inner peripheral portion thereof, and three cam grooves 23c, which are oblique with respect to an optical axis direction, on the inner peripheral portion thereof. The helicoid male thread 23a is threaded into the helicoid female thread 22a of the fixed frame 22. When the rotary frame 23 is driven in rotation by a lens barrel drive unit (not shown), it extends from a collapsed position to a photographing position while being rotated with respect to the fixed frame 22.

The linear-movement key 28 includes a projection 28a, which is slidably inserted into the linear-movement guide groove 22b of the fixed frame 22, and a key unit 28b which directly guides the linear-movement of the second-group frame 26. The linear-movement key 28 integrally advances and retracts in the optical axis direction while relatively rotating with respect to the fixed frame 22 in a state in which it is guided to move linearly by a known support mechanism without being rotated with respect to the fixed frame 22.

The zoom frame 24 is arranged as the second cylindrical frame member and has a helicoid male thread 24a, which is threaded into the helicoid female thread 23b of the rotary frame 23, on the outer peripheral portion at the rear end thereof and a guide groove 24c that passes through the cylindrical portion thereof along the optical axis direction. The first-group frame 25 acting as the second frame member is secured to the front portion of the zoom frame 24. The zoom frame 24 is guided by the cam followers 32A, 32B, . . . of the second-group frame 26 through the guide groove 24c so as to move linearly and is driven by the helicoid female thread 23b so as to advance and retract.

The second-group frame 26 is arranged as the first cylindrical frame member and has three implanting holes 26a which are defined on the peripheral portion thereof to secure the cam followers. Flat radial abutment surfaces 26b, on which the flange portions of the cam followers 32A, 32B . . . are formed around the implanting holes 26a. Further, a key groove 24d, into which the key portion 28b of the linear-movement key 28 is slidably inserted, is formed in the second-group frame 26, and further an urging spring 27 that is a compressed spring is inserted between the zoom frame 24 and the second-group frame 26. The second-group frame 26 is guided by the linear-movement key 28 so as to move linearly and is advanced and retracted by the cam grooves 23c of the rotary frame 23 through the cam followers 32A, 32B . . . .

Three cam followers are selected from a plurality of cam followers 32A, 32B, 32C, 32D, . . . whose optical axis adjustment portions have different sizes, as shown in FIG.

12, and are forcibly implanted in the three implanted holes 26a. The respective cam followers are detachably implanted in the implanting holes 26a.

The cam followers 32A, 32B, 32C, 32D, . . . are cam followers that also function as adjustment members for adjusting the optical axis. The cam followers 32A, 32B, 32C, 32D, . . . have fixing shaft portions 32a, which can be forcibly inserted in the implanting holes 26a, shaft portions 32b for regulating the rotation of the zoom frame 24, thrust abutment portions $32A_1$, $32B_1$, $32C_1$, $32D_1$, . . . , and flange portions $32A_2$, $32B_2$, $32C_2$, $32D_2$, . . . that act as decentering adjustment portions (inserted portions) having various thicknesses Tm. The thrust abutment portions $32A_1$, $32B_1$, $32C_1$, $32D_1$, . . . are arranged as inclination adjustment portions (abutment portions) that are composed of columnar shafts having various outside diameters Dm and also act as cam follower portions.

The shaft portions 32b pass through the guide groove 24c of the zoom frame 24, are slidably inserted therein, and guide the zoom frame 24 so that it moves linearly.

The surface of each of the flange portions $32A_2$, $32B_2$, . . . on the shaft portion 32a side thereof is formed as a flat surface 32c, whereas the surface of each of the flange portions $32A_2$, $32B_2$, . . . on the thrust abutment portion 32b side thereof is formed as a partially spherical surface 32d that corresponds to the curvature of the inner peripheral surface 24b of the zoom frame 24. When the cam followers are implanted, the flat surfaces 32b abut on the radial abutment surfaces 26b of the second-group frame 26, and the partially spherical surfaces 32d abut on the inner peripheral surface 24b of the zoom frame 24, that is, the flange portions $32A_2$, $32B_2$, . . . are able to be inserted between the zoom frame 24 and the second-group frame 26.

The thrust abutment portions $32A_1$, $32B_1$, . . . are inserted into the cam grooves 23c of the rotary frame 23. As shown in the developed view of FIG. 11, the cam grooves 23c have a groove width d1 so that even the abutment portion having the maximum diameter among the thrust abutment portions $32A_1$, $32B_1$, . . . of the applicable cam followers can be inserted into the cam grooves 23c.

The second-group frame 26 is supported such that the flange portions $12A_2$, $12B_2$, . . . of the three cam followers 32A, 32B, . . . , and the like are interposed with respect to the inner peripheral surface 24b of the zoom frame 24, and thereby the position of the second-group frame 26 in the radial direction is determined.

Further, the second-group frame 26 in an extended state is moved relatively rearward with respect to the zoom frame 24 and the first-group frame 25 by the urging force of the urging spring 27, and the thrust abutment portions $32A_1$, $32B_1$, . . . of the three cam followers 32A, 32B, . . . , and the like abut on the rear wall surface (imaging side) of the cam groove 24c of the zoom frame 24. In the abutment state, the a position of the second-group frame 26 in the optical axis direction and the inclination of the optical axis are determined.

Accordingly, the decentering of the optical axis O2' of the second-group frame 26 with respect to the optical axis O1 of the first-group frame 25 is adjusted by the difference in the thicknesses Tm of the flange portions $32A_2$, $32B_2$, . . . of the three cam followers 32A, 32B, . . . , and the like. Further, the inclination of the optical axis O2' of the second-group frame 26 with respect to the optical axis O1 of the first-group frame 25 is adjusted by the difference in the outside diameters Dm of the thrust abutment portions $32A_1$, $32B_1$, . . . of the cam followers 32A, 32B, . . . , and the like.

In a state in which photographing is possible, the rotary frame 23 is driven in rotation and extends forward of the fixed frame 22 as shown in FIG. 9, and the zoom frame 24 that holds the first-group frame 25 is located at a wide angle position with respect to the rotary frame 23. At the same time, the second-group frame 26 extends to the forward wide angle position by the cam grooves 23c of the rotary frame 23 through the cam followers 32A, 32B, . . . .

Further, when zooming is carried out from a wide angle mode to a telescopic mode in the photographing state, the zoom frame 24 that holds the first-group frame 25 extends to a further forward telescopic position by further rotating the rotary frame 23 in an extending direction. At the same time, the second-group frame 26 also extends to the forward telescopic position by the cam grooves 23c through the cam followers 32A, 32B, . . . .

Next, a method (assembling method) of adjusting the decentering and the inclination of the optical axis O2' of the second-group frame 26 will be described in detail using FIGS. 13 to 16.

Figure 13:
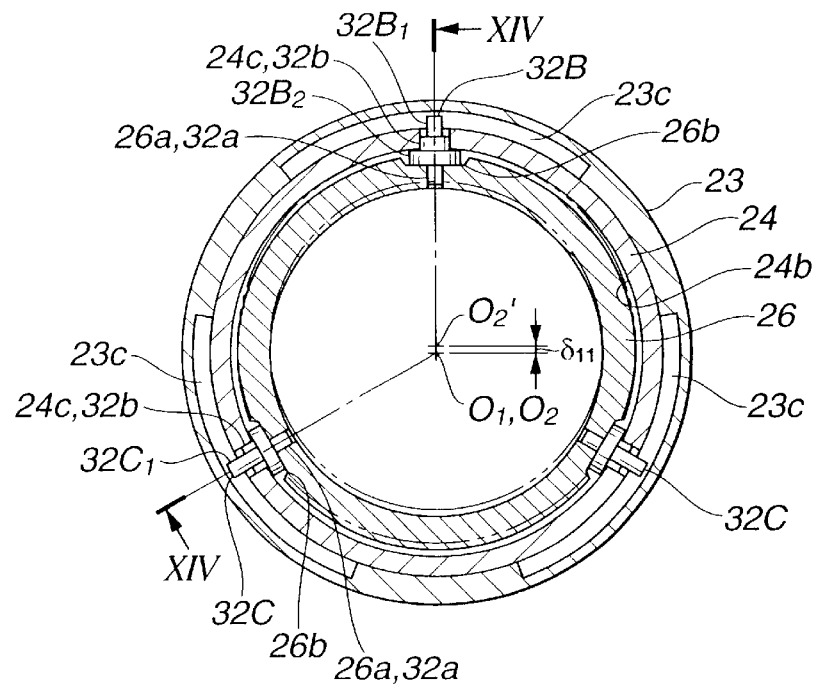
FIG. 13 is a sectional view of the lens barrel of the second embodiment shown in FIG. 9 taken in the direction perpendicular to the optical axis thereof and shows the cross sections of cam follower portions in a state in which the decentering of the optical axis is adjusted.
Figure 14:
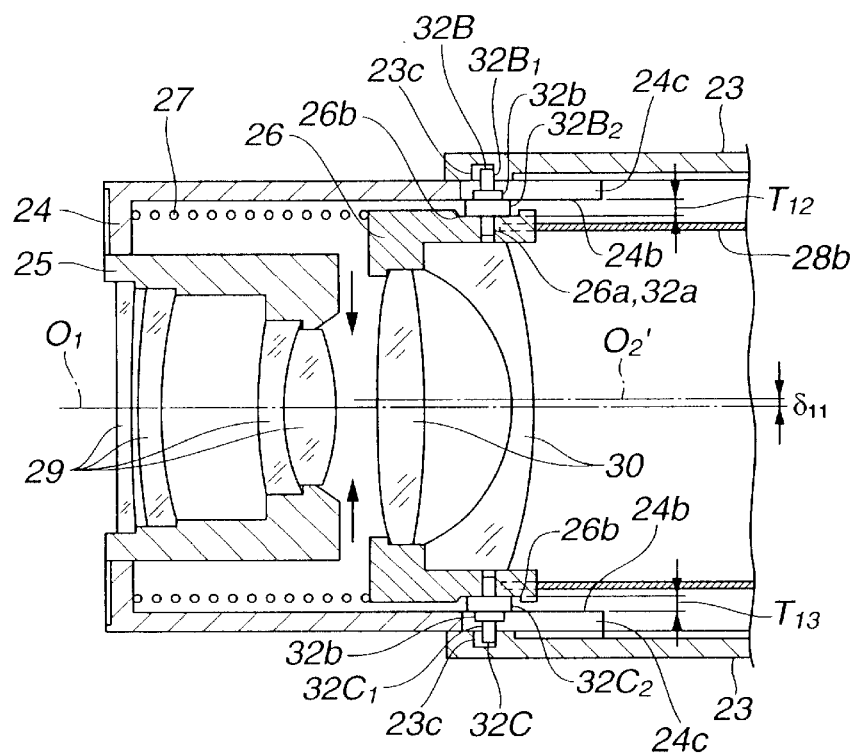
FIG. 14 is a sectional view of the lens barrel taken along the line XIV—XIV of FIG. 13.
Figure 15:
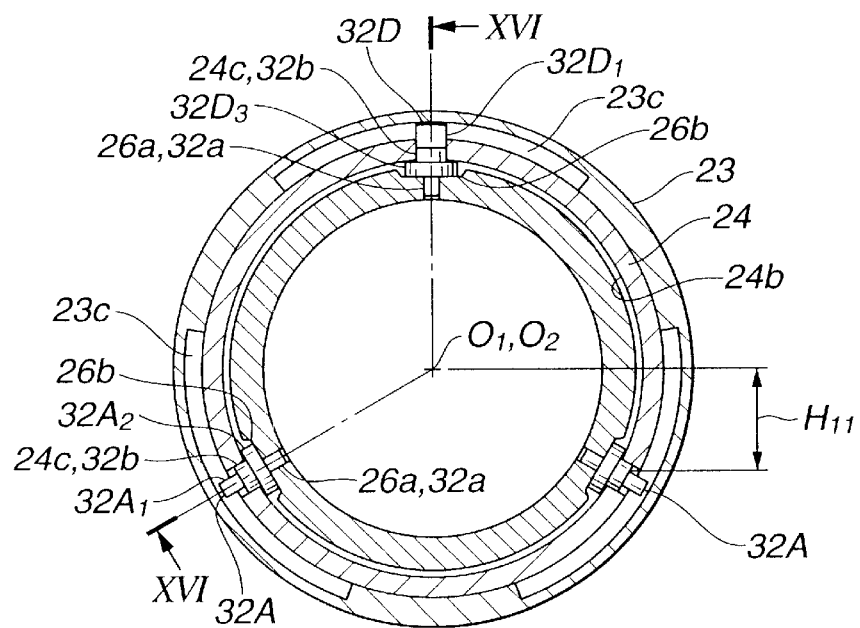
FIG. 15 is a sectional view of the lens barrel of the second embodiment shown in FIG. 9 taken in the direction perpendicular to the optical axis thereof and shows the cross sections of cam follower portions in a state in which the inclination of the optical axis is adjusted.
Figure 16:
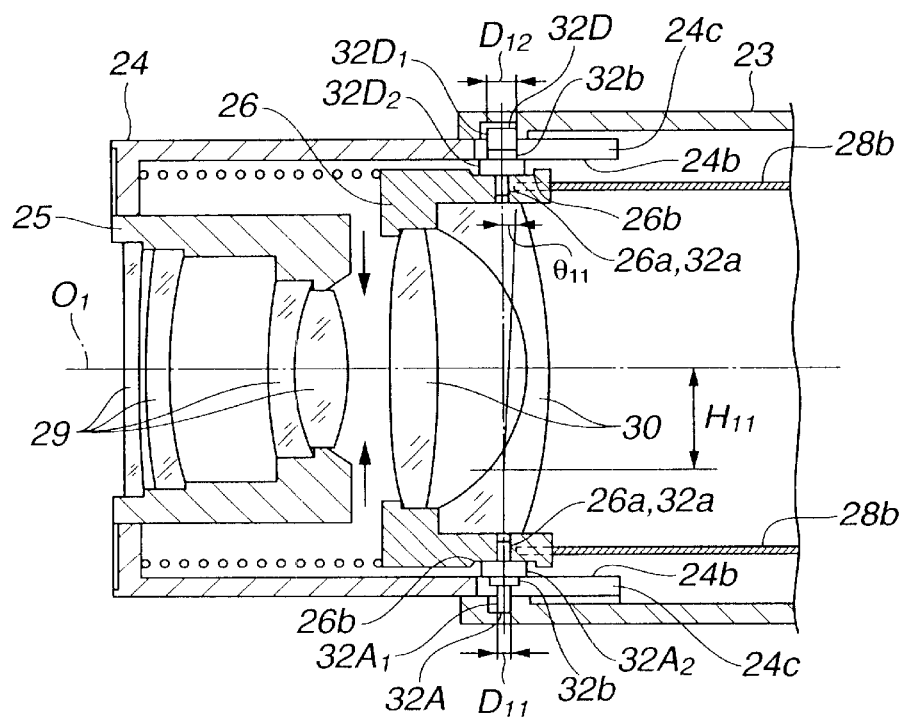
FIG. 16 is a sectional view of the lens barrel taken along the line XVI—XVI of FIG. 15.

FIG. 13 is a sectional view of the lens barrel 21 taken in the direction perpendicular to the optical axis thereof and shows the cross sections of cam follower portions in a state in which the decentering of the optical axis is adjusted. FIG. 14 is a sectional view of the lens barrel 21 taken along the line XIV—XIV of FIG. 13. FIG. 15 is a sectional view of the lens barrel 21 taken in the direction perpendicular to the optical axis thereof and shows the cross sections of the cam follower portions in a state in which the inclination of the optical axis is adjusted. FIG. 16 is a sectional view of the lens barrel 21 taken along the line XVI—XVI of FIG. 15. Note that the difference in the thicknesses of the flange portions of the cam followers and the difference in the outside diameters of the thrust abutment portions thereof are shown in FIGS. 13 to 16 and FIG. 10 in an enlarged fashion so that they can be easily understood.

When the decentering and the inclination of the optical axis are adjusted, first, three reference cam followers 32A of a standard type are mounted on the second-group frame 26 as cam followers, and the optical axis is measured using a laser-type lens decentering measuring instrument, or the like. The relative amount of decentering δ11 and the relative inclination angle θ11 of the optical axis O2' of the second-group frame 26 with respect to the optical axis O1 of the first-group frame 25 are determined by the measurement of the optical axis (refer to FIGS. 13 and 16). Note that the inclination angle θ11 of the optical axis O2' is shown by the inclination angle about the positions having a vertical distance H11 from the optical axis to the two lower cam followers.

When the amount of decentering δ11 of the optical axis O2' of the second-group frame 26 is adjusted, one cam follower 32B and two cam followers 32C, for example, are selected. Then, as shown in FIGS. 13 and 14, the cam follower 32B is fixed to one upper portion of the second-group frame 26 and the cam followers 32B are fixed to two lower positions.

The flange portions $32B_2$ and $32C_2$ of the cam followers 32B and 32C have thicknesses T12 and T13, respectively, and the thickness T12 is larger than the thickness T13 and is set to a size for moving the optical axis O2' downward by δ11. Therefore, the mounting of the cam followers causes the optical axis O2' of the second-group frame 26 to move downward by the amount of decentering δ11, as shown in FIGS. 13 and 14, and thereby the optical axis O1 of the first-group frame 25 agrees with the optical axis O2 of the second-group frame 26. When the above adjustment is performed only for the adjustment of decentering, the outside diameters of the thrust abutment portions $32B_1$ and $32C_1$ of the cam followers 32B and 32C are set to be the same as that of the thrust abutment portion $32A_1$ of the reference cam followers 32A.

When the inclination θ11 of optical axis O2' of the second-group frame 26 is adjusted, one cam follower 32D and two reference cam followers 32A, for example, are selected. Then, as shown in FIGS. 15 and 16, the cam follower 32D is fixed to one upper portion of the second-group frame 26 and the cam followers 32A are fixed to two lower portions.

The thrust abutment portions $32B_1$ and $32A_1$ of the cam followers 32D and 32A have outside diameters D12 and D11, respectively, and the outside diameter D12 is larger than the outside diameter D11 and has a size for changing the inclination of the optical axis O2' by inclination angle θ11. Therefore, the inclination of the optical axis O2' of the second-group frame 26 is corrected by the inclination angle θ11, as shown in FIG. 16, and thereby the direction of the optical axis O1 of the first-group frame 25 agrees with the direction of the optical axis O2 of the second-group frame 26. When the above adjustment is performed only for the inclination, the thickness of the flange portion $32D_2$ of the cam follower 32D is set to be the same as that of the flange portion $32A_2$ of the reference cam follower 32A.

Further, when inclination must be adjusted simultaneously with decentering, three cam followers must be selected of which both the flange portions and the thrust abutment portions have a different thickness and a different diameter in correspondence to an amount of decentering and an inclination angle.

In the adjustment of the decentering and the inclination of the optical axis, a plurality of types of cam followers are actually prepared the thrust abutment portions and the flange portions of which have each predetermined difference of size that is set stepwise as the cam followers 32B, 32C, 32D, . . . . Then, the amount of decentering and the inclination angle, which were actually measured, of the optical axis O2' of the second-group frame 26 are adjusted stepwise by selecting cam followers, which permit the amount of defection and the inclination angle to be set within allowable ranges after adjustment, from the plurality of cam followers having the sizes that are set in a stepwise manner.

According to the lens barrel 21 of the second embodiment described above, the decentering and the inclination of the optical axis can be simply and reliably adjusted, similarly to the lens barrel 1 of the first embodiment, by selecting and applying the cam followers, which have the thicknesses of the flange portions thereof and the outside diameters of the thrust abutment portions thereof that correspond to the amount of decentering and/or the inclination angle of the optical axis before adjustment, as the cam followers to be secured to the second-group frame 26 from the cam followers 32A, 32B, . . . .

In particular, the optical axis adjustment mechanism of the lens barrel 21 of the second embodiment can be applied to a lens barrel to which a cam follower that is inserted into a cam groove is applied. Further, the optical axis adjustment mechanism of the lens barrel 21 of the second embodiment is similar to that of the lens barrel 1 of the first embodiment in that the optical axis can be adjusted by changing the type of cam follower to be selected in each production lot and that the decentering and the inclination can be adjusted in intermediate directions between the directions in which the cam followers are mounted.

Note that, in the second embodiment, the wall surfaces of each of the cam grooves 23c of the rotary frame 23 in the lens barrel 21 are formed parallel to each other and the at thrust abutment portions $32A_1$, $32B_1$, . . . of the cam followers inserted into the cam grooves 23c are formed in the cylindrical surface in correspondence to the parallel wall surfaces. However, the present invention is not limited thereto, and a similar optical axis adjustment mechanism can be also applied to a lens barrel having such a cam mechanism such that each cam groove is formed of an inclined-taper groove and the thrust abutment portion of each cam follower is formed of a conical surface.

Next, cam followers of a first modification to the plurality of cam followers 32A, 32B, 32C, 32D, . . . that are applied to the lens barrel 21 of the second embodiment will be described.

Figure 17:
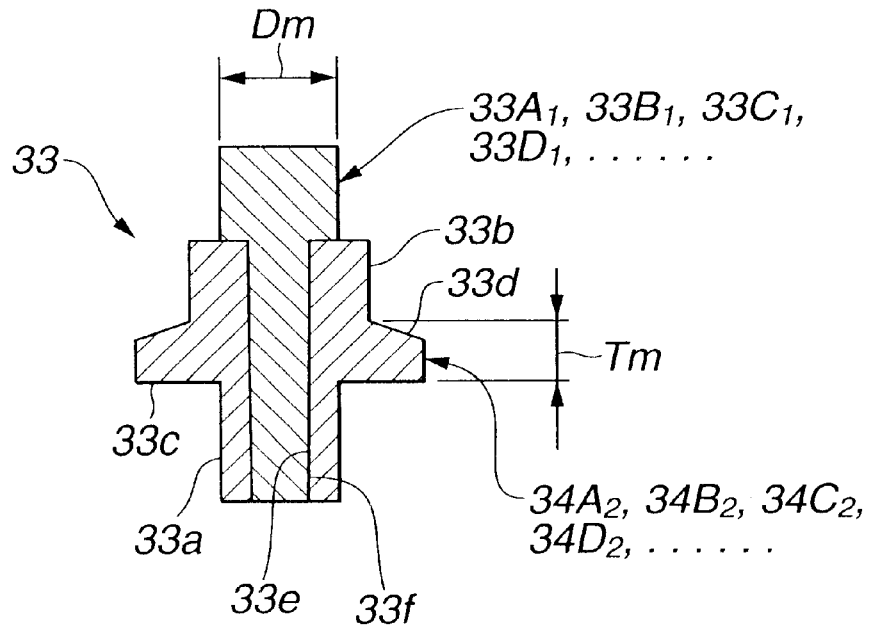
FIG. 17 is a longitudinal sectional view of a cam follower of a first modification to the cam follower applied to the lens barrel of the second embodiment shown in FIG. 9.

FIG. 17 is a longitudinal sectional view of a cam follower 33 of the first modification.

A lens barrel to which the cam follower 33 of the modification is applied is similar to the lens barrel 21 of the second embodiment shown in FIG. 9. Thus, the following description will refer only to the portions of the cam follower 33 which are different from those of the cam follower used in the second embodiment.

The cam followers 33 are a plurality of follower members that also function as adjustment members for adjusting the optical axis. They are composed of two kinds of members each of which has a different size and which can be combined with each other, that is, they are composed of combinations of thrust abutment members $33A_1$, $33B_1$ $33C_1$, $33D_1$, . . . acting as inclination adjustment members and flange members $33A_2$, $33B_2$, $33C_2$, $33D_2$, . . . acting as decentering adjustment members.

Each of the thrust abutment members $33A_1$, $33B_1$, . . . is composed of a columnar shaft member having a different outside diameter Dm and further having a shaft portion 33f with a predetermined outside diameter which can be forcibly inserted into the shaft hole 33e of each of the flange members $33A_2$, $33B_2$, . . . .

Each of the flange members $33A_2$, $33B_2$, . . . is composed of an inserted member (member to be inserted) having a different flange thickness Tm. Further, each of the flange members $33A_2$, $33B_2$, . . . has a fixing shaft portion 33a with a predetermined outside diameter, a shaft portion 33b, and the shaft hole 33e. The fixing shaft portion 33a can be forcibly inserted into an implanting hole 26a of the second-group frame 26, the shaft portion 33b is inserted into the linear-movement guide groove 24c of the zoom frame 24 and regulates the rotation of the zoom frame 24, and the shaft hole 33e permits the shaft portion 33f of each of the thrust abutment members $33A_1$, $33B_1$, . . . to be forcibly inserted thereinto and secured therein. It should be noted that the surface of each of the flange portions of the flange members $33A_2$, $33B_2$, . . . on the shaft portion 33a side thereof is formed in a flat surface 33c, whereas the surface of each of the flange portions on the shaft portion 33b side thereof is formed as a partially spherical surface 33d that corresponds to the curvature of the inner peripheral surface 24b of the zoom frame 24.

The optical axis of the lens barrel 21, to which the cam followers 33 of the modification are applied, is adjusted by a method substantially similar to the method of adjusting the optical axis in the second embodiment. In the above cam followers 33, however, a cam follower, which is composed of a reference thrust abutment member $33A_1$ combined with a reference flange member $33A_2$ via a shaft portion 33f, is employed as a reference cam follower 33.

When the optical axis is adjusted, three sets of the reference cam followers 33 are assembled on the lens barrel 21, and first, the amount of decentering of the optical axis O2' is measured. Three flange members having a thickness Tm capable of correcting the measured amount of decentering are selected from the flange member $33A_2$, $33B_2$, . . . , combined with the reference thrust abutment members $33A_1$, and are assembled on the lens barrel 21. Then, the amount of inclination of the optical axis O2' is further measured. Thrust abutment members having an outside diameter Dm capable of correcting the measured amount of inclination are selected from the thrust abutment members $33A_1$, $33B_1$, . . . , and are combined with the above flange members, which have been assembled, are assembled on the lens barrel 21, thereby completing the adjustment of the optical axis.

When the cam followers 33 of the first modification are applied, cam followers 33 having many kinds of outside diameters Dm or thicknesses Tm can be formed by selecting and combining the thrust abutment members and the flange members which have a few sizes. Accordingly, the number of different kinds of the thrust abutment members $33A_1$, . . . or the number of different kinds of the flange members $33A_2$, $33B_2$, . . . which are prepared to make adjustment of a predetermined accuracy are reduced, thus permitting the number of parts which are prepared for manufacturing to be decreased.

Next, cam followers of a second modification to the plurality of cam followers 32A, 32B, 32C, and 32D, . . . that are applied to the lens barrel 21 of the second embodiment will be described.

Figure 18:
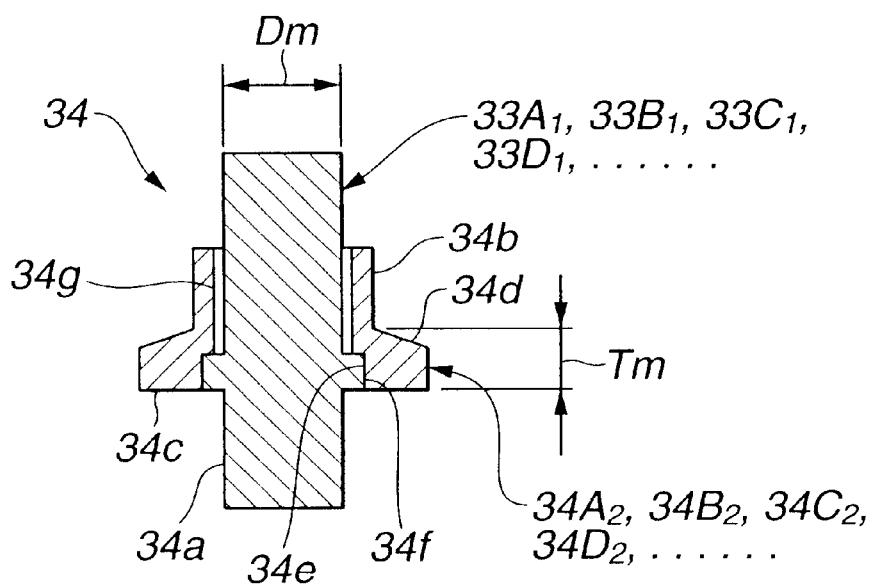
FIG. 18 is a longitudinal sectional view of a cam follower of a second modification of the cam follower applied to the lens barrel of the second embodiment shown in FIG. 9.

FIG. 18 is a longitudinal sectional view of a cam follower 34 of the second modification.

A lens barrel to which the cam follower 34 of the modification is applied is similar to the lens barrel 21 of the second embodiment shown in FIG. 9. Thus, the following description will refer only to the portions of the cam follower 34 which are different from those of the cam follower used in the second embodiment.

The cam followers 34 are a plurality of follower members that also function as adjustment members for adjusting the optical axis. They are composed of two kinds of members each of which has a different size and which can be combined with each other, that is, they are composed of combinations of thrust abutment members $34A_1$, $34B_1$ $34C_1$, $34D_1$, . . . acting as inclination adjustment members and flange members $34A_2$, $34B_2$, $34C_2$, $34D_2$, . . . acting as decentering adjustment members.

Each of the thrust abutment members $34A_1$, $34B_1$ . . . is composed of a columnar shaft member having a different outside diameter Dm and further having a fixing shaft portion 34a with a predetermined outside diameter, which can be forcibly inserted into an implanting hole 26a of the second-group frame 26, and a small flange portion 34f with a predetermined outside diameter which can be forcibly inserted into the engaging hole 34e of each of the flange members $34A_2$, $34B_2$, . . . .

Each of the flange members $34A_2$, $34B_2$, . . . is composed of an inserted member having a different flange thickness Tm. Each of the flange members $34A_2$, $34B_2$, . . . further has a shaft portion 34b, the engaging hole 34e, and a hole 34g. The shaft portion 34b is inserted into the linear-movement guide groove 24c of the zoom frame 24 and regulates the rotation thereof, the engaging hole 34e permits the small flange portion 34f of each of the thrust abutment members $34A_1$, . . . $34B_1$, to be forcibly inserted thereinto and secured therein, and the hole 34g permits a thrust abutment member to pass therethrough. It should be noted that the surface of each of the flange portions of the flange members $34A_2$, $34B_2$, . . . on the shaft portion 34a side thereof is formed in a flat surface 34c, whereas the surface of each of the flange portions on the shaft portion 34b side thereof is formed in a partially spherical surface 34d that corresponds to the curvature of the inner peripheral surface 24b of the zoom frame 24.

The optical axis of the lens barrel 21, to which the cam followers 34 of the modification are applied, is adjusted by a method substantially similar to the method of adjusting the optical axis in the second embodiment. In the above cam followers 34, however, a cam follower, which is composed of a reference thrust abutment member $34A_1$ combined with a reference flange member $34A_2$ through a small flange portion 34f, is employed as a reference cam follower.

When the optical axis is adjusted, three sets of the reference cam followers 34 are assembled to the lens barrel 21, and first, the amount of decentering of the optical axis O2' is measured. Three flange members having a thickness Tm capable of correcting the measured amount of decentering are selected from the flange members $34A_2$, $34B_2$, . . . combined with the reference thrust abutment members $34A_1$, and assembled to the lens barrel 21. The amount of inclination of the optical axis 02' at that time is measured. Thrust abutment members having an outside diameter Dm capable of correcting the measured amount of inclination are selected from the thrust abutment members $34A_1$, . . . and combined with the above flange members having been assembled and assembled to the lens barrel 21, thereby completing the adjustment of the optical axis.

When the cam followers 34 of the aforementioned modification are applied, an effect similar to that of the case in which the cam followers 33 of the first modification is applied can be achieved.

It should be noted that the optical axis adjustment method, to which the cam followers 33 and 34 of the first and second modifications are applied, is such that one of the amount of decentering of the optical axis and the amount of inclination thereof is adjusted by selecting any of the flange members and the thrust members first, and then the other one of the amount of inclination of the optical axis or the amount of decentering thereof is adjusted by selecting the other thrust members and flange members. However, the present invention is not limited to the above method, and it is possible to simultaneously adjust the optical axis by selecting a combination of thrust members and flange members capable of correcting the amount of decentering of the optical axis and the amount of inclination thereof based on a result of measurement of the decentering of the optical axis that is carried out by assembling cam followers each composed of a reference flange member and a reference thrust member.

Moreover, it is a matter of course that the cam followers 33 and 34 of the first and second modifications can be also applied to the lens barrel 1 of the first embodiment.

What is claimed is:

1. A lens barrel comprising:
   a first frame member for supporting lenses;
   a second frame member for holding the first frame member; and
   a plurality of adjustment members interchangeably secured to the first frame member, each of the plurality of adjustment members including an abutment portion abutting on the second frame member in an optical axis direction to adjust an amount of inclination of an optical axis of the lenses with respect to an optical axis of other lenses in the lens barrel through the second frame member.

2. A lens barrel according to claim 1, wherein a size of the abutment portion of at least one of the plurality of adjustment members is different from a size of the abutment portions of the other adjustment members.

3. A lens barrel according to claim 1, wherein each of the plurality of adjustment members further includes an inserted portion that is inserted between the first frame member and the second frame member to adjust decentering between the optical axis of the lenses and the optical axis of the other lenses in the lens barrel through the second frame member.

4. A lens barrel according to claim 3, wherein the inserted portions are interchangeable with the abutment portions.

5. A lens barrel according to claim 3, wherein a size of the inserted portion of at least one of the plurality of adjustment members is different from a size of the inserted portions of the other adjustment members.

6. A lens barrel according to claim 3, wherein one of the first frame member and the second frame member is relatively movable with respect to the other of the first frame member and the second frame member.

7. A lens barrel according to claim 3, wherein the adjustment members comprise fixing shaft portions adapted to be fixed to the first frame member, flange portions that act as the inserted portions and that have a thickness in a radial direction of the lens barrel, and columnar shaft portions acting as the abutment portions.

8. A lens barrel according to claim 3, wherein the second frame member includes cam grooves, and the abutment portions of the adjustment members are adapted to be engaged with the cam grooves.

9. A lens barrel according to claim 7, wherein a diameter of the columnar shaft portion of at least one of the plurality of adjustment members is different from a diameter of the columnar shaft portions of the other adjustment members.

10. A lens barrel according to claim 7, wherein a thickness of the flange portion of at least one of the plurality of adjustment members is different from a thickness of the flange portions of the other adjustment members.

11. A lens barrel according to claim 7, wherein a diameter of the columnar shaft portion and a thickness of the flange portion of at least one of the plurality of adjustment members are different from a diameter of the columnar shaft portions and a thickness of the flange portions of the other adjustment members, respectively.

12. A lens barrel comprising:
a first frame member for supporting lenses;
a second frame member for holding the first frame member; and
a plurality of adjustment members interchangeably secured to the first frame member, each of the plurality of adjustment members including an inserted portion inserted between the first frame member and the second frame member to adjust decentering between an optical axis of other lenses in the lens barrel and an optical axis of the lenses through the second frame member.

13. A lens barrel according to claim 12, further comprising:
a third frame member for supporting the second frame member,
wherein each of the adjustment members further includes an abutment portion abutting on the third frame member in an optical axis direction to adjust inclination of the lenses with respect to the optical axis of the other lenses in the lens barrel through the second frame member.

14. A lens barrel according to claim 13, wherein a size of the abutment portion of at least one of the plurality of adjustment members is different from a size of the abutment portions of the other adjustment members.

15. A lens barrel according to claim 14, wherein one of the second frame member and the third frame member is relatively movable with respect to the other of the second frame member and the third frame member.

16. A lens barrel according to claim 13, wherein the adjustment members comprise fixing shaft portions adapted to be fixed to the first frame member, flange portions that act as the inserted portions and that have a thickness in a radial direction of the lens barrel, and columnar shaft portions acting as the abutment portions.

17. A lens barrel according to claim 16, wherein the flange portions are adapted to be inserted between the first frame member and the second frame member, and the columnar shaft portions abut on the third frame member in the optical axis direction.

18. A lens barrel according to claim 12, wherein a size of the inserted portion of at least one of the plurality of adjustment members is different from a size of the inserted portions of the other adjustment members.

19. A lens barrel according to claim 12, wherein the adjustment members further include abutment portions abutting on the second frame member in an optical axis direction to adjust inclination of the lenses with respect to the optical axis of the other lenses in the lens barrel through the second frame member.

20. A lens barrel according to claim 19, wherein the abutment portions are adapted to be exchanged with the inserted portions.

21. A lens barrel according to claim 19, wherein a size of the abutment portion of at least one of the plurality of adjustment members is different from a size of the abutment portions of the other adjustment members.

22. A lens barrel according to claim 19, wherein one of the first frame member and the second frame member is relatively movable with respect to the other of the first frame member and the second frame member.

23. A lens barrel according to claim 19, wherein the adjustment members comprise fixing shaft portions fixed to the first frame member, flange portions that act as the inserted portions and that have a thickness in a radial direction of the lens barrel, and columnar shaft portions acting as the abutment portions.

24. A lens barrel according to claim 19, wherein the second frame member includes cam grooves, and the abutment portions of the adjustment members are adapted to be engaged with the cam grooves.

25. A lens barrel according to claim 23, wherein a diameter of the columnar shaft portion of at least one of the plurality of adjustment members is different from a diameter of the columnar shaft portions of the other adjustment members.

26. A lens barrel according to claim 23, wherein a thickness of the flange portion of at least one of the plurality of adjustment members is different from a thickness of the flange portions of the other adjustment members.

27. A lens barrel according to claim 23, wherein a diameter of the columnar shaft portion and a thickness of the flange portion of at least one of the plurality of adjustment members are different from a diameter of the columnar shaft portions and a thickness of the flange portions of the other adjustment members, respectively.

28. A method of assembling a lens barrel that comprises a first frame member for supporting lenses, a second frame member for holding the first frame member, and adjustment members detachably secured to the first frame member, each of the adjustment members including an inserted portion inserted between the first frame member and the second frame member to adjust decentering between an optical axis of the lenses and an optical axis of other lenses in the lens barrel through the second frame member, the method comprising:

assembling a plurality of the adjustment members, each having a same shape, on the lens barrel;

measuring an amount of the decentering of the lenses;

selecting respective ones of the adjustment members based on the measured amount of decentering from a plurality of kinds of the adjustment members each having an inserted portion of a different size; and assembling the selected adjustment members on the lens barrel.

29. A method of assembling a lens barrel that comprises a first frame member for supporting lenses, a second frame member for holding the first frame member, and adjustment members detachably secured to the first frame member, each of the adjustmemt members including an abutment portion abutting on the second frame member in an optical axis direction to adjust inclination between an optical axis of the lenses and an optical axis of other lenses in the lens barrel through the second frame member, the method comprising:

assembling a plurality of the adjustment members, each having a same shape, on the lens barrel;

measuring the amount of inclination of the lenses;

selecting respective ones of the adjustment members based on the measured amount of inclination from a plurality of kinds of the adjustment members each having an abutment portion of a different size; and assembling the selected adjustment members on the lens barrel.

30. A method of assembling a lens barrel that comprises a first frame member for supporting lenses, a second frame member for holding the first frame member, and adjustment members detachably secured to the first frame member, each of the adjustment members including an inserted portion inserted between the first frame member and the second frame member to adjust decentering between an optical axis of the lenses and an optical axis of other lenses in the lens barrel through the second frame member as well as including an abutment portion abutting on the second frame member in an optical axis direction to adjust inclination between the optical axis of the lenses and the optical axis of other lenses in the lens barrel through the second frame member, the method comprising:

assembling a plurality of the adjustment members, each having a same shape, on the lens barrel;

measuring an amount of decentering and an amount of inclination of the lenses;

selecting respective ones of the adjustment members from a plurality of kinds of the adjustment members each having a combination of an inserted portion of a different size and an abutment portion of a different size; and assembling the selected adjustment members on the lens barrel.

* * * * *